United States Patent [19]
Shadikhan

[11] Patent Number: 5,820,748
[45] Date of Patent: Oct. 13, 1998

[54] SAFE REMOVAL OF GASSES, WATER AND SOLVENTS FROM USED LUBRICATING OILS WITH VACUUM APPARATUS UNDER MILD TEMPERATURE CONDITIONS

[76] Inventor: Tajwar Shadikhan, 5$^{th}$ SR. No. 5, Honglok Yuen, Tai Po, Hong Kong

[21] Appl. No.: 845,743

[22] Filed: Apr. 25, 1997

[51] Int. Cl.$^6$ .......................... C10G 31/06; C10G 33/00; B01D 1/00
[52] U.S. Cl. .......................... 208/179; 208/187; 202/205; 202/236; 202/237; 196/98; 196/114; 196/128; 196/133
[58] Field of Search .................................... 202/236, 153, 202/158, 159, 185, 205, 237; 203/DIG. 16; 208/179, 187; 196/98, 114, 128, 133

[56] References Cited

U.S. PATENT DOCUMENTS

| | | | |
|---|---|---|---|
| 2,702,268 | 2/1955 | Egger et al. | 196/75 |
| 4,863,570 | 9/1989 | Wijn | 203/91 |
| 5,328,596 | 7/1994 | Gammie, II | 208/321 |
| 5,419,814 | 5/1995 | Kunihiro et al. | 202/236 |
| 5,458,739 | 10/1995 | Boucher et al. | 202/153 |

FOREIGN PATENT DOCUMENTS

| | | |
|---|---|---|
| 413537 | 7/1934 | United Kingdom . |
| 428762 | 5/1935 | United Kingdom . |
| 2003394 | 3/1979 | United Kingdom . |
| 2211198 | 6/1989 | United Kingdom . |

OTHER PUBLICATIONS

British Railways Board, Letter from G.B. Buckley, 6 Jul. 1987.
U.S. application No. 07/326,333 Amendment, ca. 1990.

*Primary Examiner*—Glenn Caldarola
*Assistant Examiner*—Bekir L. Yildirim
*Attorney, Agent, or Firm*—Christopher John Rudy

[57] ABSTRACT

Gasses, water and solvents, major contaminants in used lubricating oils, can be removed from used lubricating oils at mild temperature conditions under vacuum. Apparatus in which the removal can take place includes a hollow vacuum separator vessel with a spray nozzle to spray an ultra fine spray of warm, used lubricating oil onto an angularly disposed thin film separator plate. In conjunction with the plate is a cooling device within the vacuum chamber. Cleaned oil can be passed from the bottom back into a holding tank, while water and solvents are drained out into a separate tank for safe disposal.

13 Claims, 1 Drawing Sheet

SAFE REMOVAL OF GASSES, WATER AND SOLVENTS FROM USED LUBRICATING OILS WITH VACUUM APPARATUS UNDER MILD TEMPERATURE CONDITIONS

BACKGROUND TO THE INVENTION

I. Field of the Invention

The present invention concerns apparatus and methodology for removal of gasses, water and/or solvents under vacuum conditions, or what may be considered to be a partial decontamination, of oils. In particular, vacuum apparatus and mild temperatures are employed so as to remove gasses, water and solvents such as fuel from the used oil, which, preferably, had been first treated to remove solid particulate matter and sludges therefrom.

II. Initial Considerations Related to the Invention

After lubricating oil has been in an internal combustion engine for some time, it becomes contaminated with micron and sub-micron sized particles of carbon, metals and other insoluble materials, and also it contains varying amounts of water and fuel. In time, the desired lubricating properties, which the oil initially possessed, become affected by such contaminants, and the contaminated oil must be replaced to avoid damage to the engine. The properties of the lubricating oil itself may be largely unchanged if the contaminants can be removed.

III. Particular Known Art Which May Relate to the Invention

Tajwar Shadikhan, U.S. patent application Ser. No. 08/490,685 filed on Jun. 15, 1995, discloses decontamination of used lubricating oils including especially from water and solvents with vacuum separator system. In nature and gist thereby, used lubricating oils can be reclaimed, to include especially in conjunction with removal of sludges, and of particulate, solid matter such as micron and sub-micron sized particles of dirt, metal, and so forth, by specially formulated coagulants, and by employing a vacuum and mild temperature in the removal of water and solvent from the used oil. A chilled shell and tube condenser is desirably employed to condense contaminants from the vapor state. As well, desirably included therein are employment of heat-insulated vessels, a thin-film plate for evaporation of the liquid impurities, and a uniquely arranged, powerful mechanical pump system, among other things, for excellent operating efficiency and extremely pure product. An auxiliary heating element can be present under the thin-film evaporator surface, which surface is desirably angularly disposed, for example, being cone shaped. Oil is sprayed onto the evaporator surface under vacuum conditions.

Tajwar Shadikhan, U.S. patent application Ser. No. 07/326,333 filed on Mar. 21, 1989, earlier had disclosed recovery of lubricating oil. Thereby, in general, dirty lubricating oil is cleaned by a method in which the oil is heated and subjected to flash evaporation. Oil is treated with a coagulant to flocculate micron and sub-micron sized insoluble matter. Initially in the flash evaporation, water evaporates off, and then the pressure and temperature are changed to flash off the fuel. Cleaned oil is drained for reuse. Vacuum apparatus for that method includes a series of concentric baffle plates, which are generally heated, for the flash evaporation. Note, U.K. patent application No. 8,724, 607 published on Jun. 28, 1989 as GB 2 211 198 A.

According to one well-known procedure, the solid contaminants are removed by adding a coagulant to flocculate micron and sub-micron sized insoluble particles. A suitable coagulant for that is an aqueous-based composition containing hydroxylic and single or complex oxygen functionality amino compounds. The coagulant causes the solid particles to separate, leaving a partially cleaned lubricating oil. An advantage of this process is that unused oil additives may be unaffected by the procedure. Ref., unpublished U.K. patent application No. 7,905,434 by British Rail. Note, this coagulant will not change additive composition or largely remove the same from oil in processing.

An older process to remove solids discloses employment of solid aluminum chloride to purify and regenerate used lubricating oil, and requires a previously dried used oil sample. See, U.K. patent specification No. 413,537 (Jul. 19, 1934).

Certain other improvements in or relating to purifying and revivifying oils have been disclosed, which heat oil after treatment with a coagulating agent under vacuum, hoping to drive off light spirits or moisture. See, U.K. patent specification No. 428,762 (May 7, 1935).

Liquid separation has also been disclosed for separation of a liquid component from a liquid mixture by first heating the mixture in a heat exchanger and then spraying the heated mixture through nozzles into a vacuum chamber. See, U.K. patent application No. GB 2 003 394 A (14 Mar., 1977).

Egger et al., U.S. Pat. No. 2,702,268 (Feb. 15, 1955), also discloses an oil treating process to remove impurities. The art of that patent employs a constant temperature distillation zone, which has chamber walls which are heated independently of the conglomeration to be treated, and water and fuel are removed from the sample to be treated in one step.

Note, the latter three methods are done in high temperature.

In addition, the following art is cited:

Kunihiro et al., U.S. Pat. No. 5,419,814 (May 30, 1995), discloses a thin layer liquid film type evaporator. It relates to a thin layer liquid film type evaporator and more particularly to such an evaporator used for separation and purification of mineral oils and solvents, or condensation of substances which are not very susceptible to thermal cracking.

Boucher et al., U.S. Pat. No. 5,458,739 (Oct. 17, 1995), discloses a volatiles separator and concentrator. It relates to an apparatus and method for stripping volatiles from a feed stream, concentrating the volatiles in overhead vapors, forming a condensate product, and producing a low percent alcohol concentrate product outlet stream as a residue or tails within a singular modular unit and in the same unit of operation. It provides a continuous system of reducing the alcohol content of wine, beer, distilled spirits.

IV. Prevailing Problems and Desires in the Art

Today's engine oils contain more sophisticated additives than those of yesteryear. These more sophisticated additives can be damaged through treatment with prior processes, and yet, if the oil which contains them can be decontaminated from particulates, water and fuel, the oil and additive mixture remains serviceable.

Additives are removed from the blend by the running engine.

It would be desirable to more effectively decontaminate and to be able to more fully reuse the oils of today as if they were original oils, with their sophisticated additive components intact. Such reclaimed oil can have very high value, as today, even with higher and higher crude oil prices, the additives which are employed in admixture with the refined oil stock can be more expensive than the oil stock itself.

SUMMARY OF THE INVENTION

The present invention provides an apparatus useful for separating gasses, water and solvents from used lubricating oil, which comprises a vacuum separator tank, which includes a hollow vessel capable of being subjected to a vacuum, and, positioned above a bottom portion of the hollow vessel, a spray nozzle positioned above an evaporator surface, and, in conjunction with the evaporator surface, a cooling device, said vessel including a volume below the cooling device capable of containing or passing through oil as bottoms, which arrangement can provide a uniform, thin film of oil for evaporation of fluid contaminants and feed of cleaned oil to to be pumped out from bottoms; and a vacuum pump which can draw vapors emanating from the separator tank thereaway, and which can provide a vacuum to the hollow vessel. For example, in an apparatus such as the apparatus disclosed in Shadikhan's U.S. patent application Ser. No. 08/490,685, the improvement can comprise a cooling device positioned in conjunction with the angularly disposed, evaporator surface in that so-called distillation tank. Also provided is operative use of the apparatus in a procedure for decontamination of a used lubricating oil containing matter in the gaseous state, water and/or solvent (s), carried out under mild operating conditions of temperature, with cooling carried out with the cooling device in conjunction with the evaporator surface.

The invention is useful in removing fluid contaminants from used lubricating (lube) oil.

Significantly, by the invention, oil decontamination, to particularly include the decontamination of today's engine oils, is taken to an almost incredible level of perfection, with the saving intact of essentially all of the unspent sophisticated additive components in and with the base oil stock. Any lost additives generally have resulted from use in the engine, and can be replenished. Mild conditions of temperature are employed, and the cooling device positioned below the evaporator surface in the separator tank is a notable advance. The invention is most fully commercially practicable, with field station size apparatus an advantageous embodiment.

Numerous further advantages attend the invention.

THE DRAWINGS IN BRIEF

The drawings form part of the specification hereof. In the drawings, the following is noted:

ILLUSTRATIVE DETAIL

Figure 1:
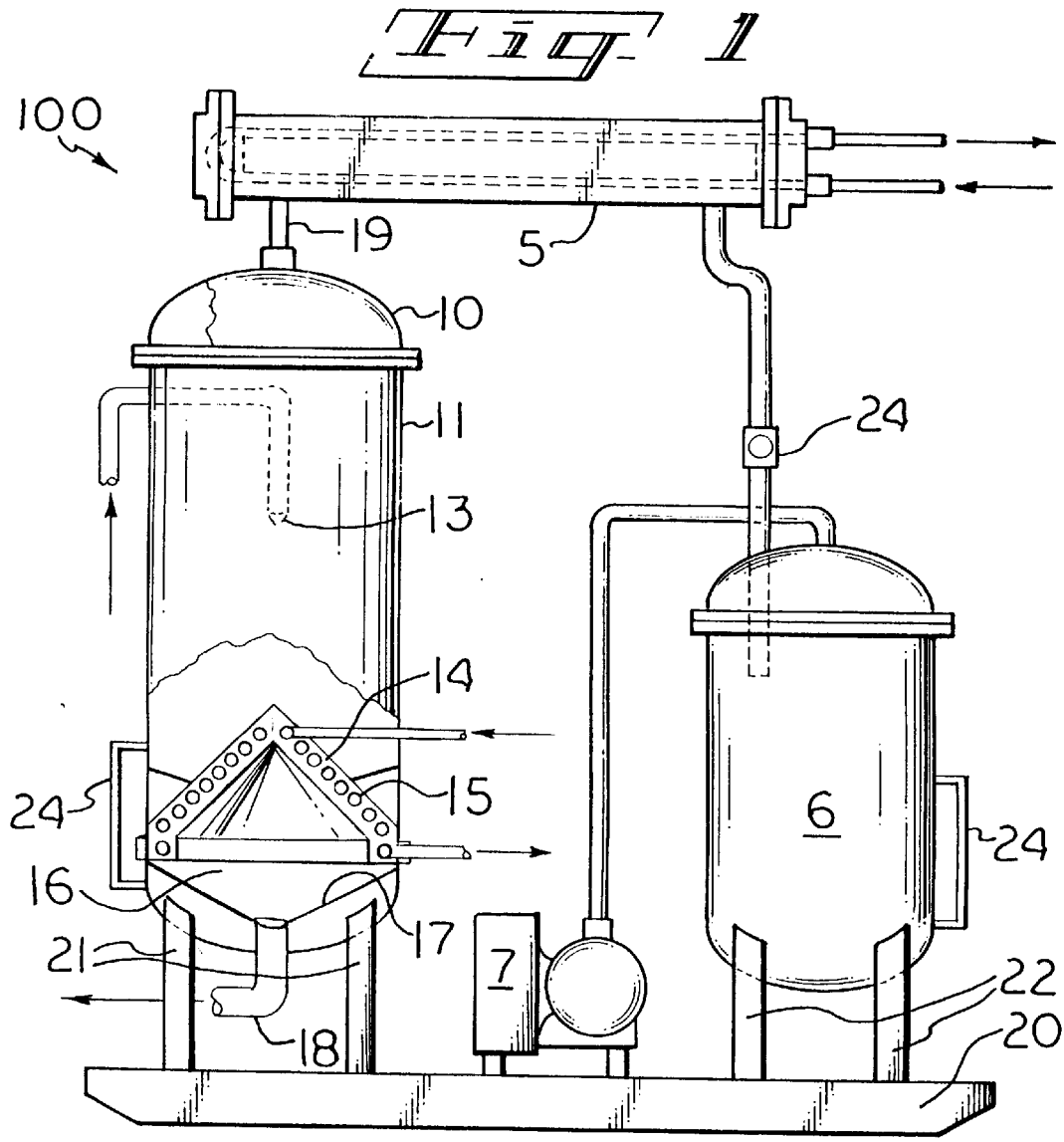
FIG. 1 depicts a plan, partial cut-away view of an apparatus of the present invention, to include a separator tank, which contains a cooling device in conjunction with an evaporator surface thereof.
Figure 2:
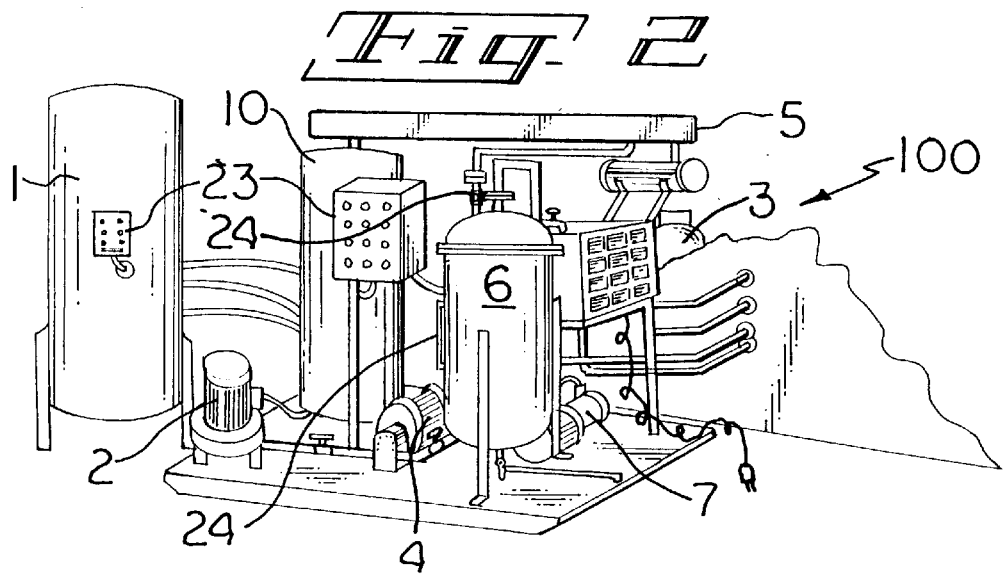
FIG. 2 depicts the apparatus of FIG. 1 installed with accessory equipment.

The invention can be further understood by consideration of the present detail, which may be taken with reference to the accompanying drawings. The same should be viewed in an illustrative and not necessarily limiting sense.

The complete specifications of the aforementioned U.S. patent applications by Tajwar Shadikhan are incorporated herein by reference.

Herein, the following definitions are employed:

"Fluid" refers to a gas and/or liquid.

"Mild operating conditions of temperature" generally indicates that the body of oil which is acted upon within the apparatus and procedure is kept at or below about ninety degrees C. The temperature desirably is kept at or below about eighty degrees C. Thus, mild operating conditions of temperature can include those temperatures where the oil sample to be sprayed from the spray nozzle is heated to a temperature about from twenty to eighty degrees C.

"Procedure" refers to a method and/or process.

"Safe" generally indicates that, with respect to the oil, additives in the used oil are conserved to a significant or substantial if not complete extent, and the structural body of the oil is kept significantly or substantially if not completely intact (unchanged) and suitable for reuse. The same term also indicates that, with respect to the environment, generally with the practice of the invention environmental contamination can be kept to acceptable levels, especially due to low temperature operating conditions, which, for example, may help control generation of polynuclear aromatics (fumes) that may otherwise form at higher temperatures, e.g., two hundred fifty degrees C., or more.

With reference to the drawings, the following is noted:

System apparatus 100 includes separation tank 10 which includes hollow vessel 11 made, for example, of mild steel, capable of being subjected internally to vacuum conditions. The separation tank 10 and accessory components may be insulated.

Into the hollow vessel 11, through pipe 12, for example, of iron or steel, is fed oil to nozzle 13. The oil sample may be contained in a storage or coagulation/settling tank 1 from whence it can be provided as by pumping to the pipe 12 with use of a rotary pump 2, and, prior to its introduction into the pipe 12, the oil sample may be heated in a heating chamber or tank such as disclosed by the aforementioned U.S. specifications of Tajwar Shadikhan. The spray nozzle 13 can provide through generally annularly disposed outlet orifices an ultra fine mist of oil. Below the nozzle 13, for example, of metal, is evaporator surface 14, for example, of conical shape with a skirt thereto such as of aluminum, brass or steel, for example, stainless steel, onto the upper surface of which oil from the nozzle 13 can be sprayed as a uniform, thin film for enhanced evaporation of fluid contaminants, especially water and solvent such as fuel, and for feed of cleaned oil to cleaned oil bottoms. Positioned in conjunction with the evaporator surface 14 is cooling device 15, for example, of a metal such as steel, for example, stainless steel in the form of suitably coiled tubing, and it can be cooled by chilled fluid, for example, by chilled water running inside the cooling device 15. Operating temperatures of the cooling device may include those about from zero or five or ten to fifteen or twenty-five degrees C. Cold fluid can be pumped into the cooling device 15 and warm fluid out, for example, the chilled water can be pumped in, and the warm water can be pumped out to standard cooling tower 3 for cooling and recycle. The warmed water retains heat captured from the oil with its additive components to keep the same in an essentially pristine state substantially free from decomposition. Below the nozzle 13, evaporator surface 14, and chilling device 15, is volume 16, which is capable of affording a space for holding a small amount of oil and passing through cleaned oil as bottoms. Drain 17 such as of steel, for example, stainless steel, is provided so as to make collection of the bottoms product effective. Product pipe 18, for example, of iron or steel, can be employed as a conduit for removal the oil as bottoms, for example, to the holding tank 1, and mechanical vane pump 4 can be employed for this. Parts such as may be mounted firmly with stainless steel struts. In an apparatus adapted for successive recycle, the oil can be provided the storage or coagulation/settling tank as a holding tank and returned to the hollow vessel 11 through the nozzle 13 for successive decontamination until the oil sample is operated upon as desired, for example, to a satisfactory level of purification with essentially no breakdown and/or loss of lube oil and its additives. One evaporator surface 14 may be present, which is in the shape of a cone with a skirt, which are both directly cooled by the cooling device 15, and the drain 17 may be present as a plate and be shaped inwardly conically below the cooled surface.

Fluid contaminants from the sprayed oil vaporize and exit through top pipe 19 to standard, cooled shell and tube condenser 5 such as cooled by chilled fluid, for example, air at about from zero or five or ten to fifteen or twenty-five degrees C. The air entering the condenser 4 may be provided from the cooling tower 3 which may be, for example, the same tower to which warm water from the cooling device 15 is transmitted for its cooling. By the condenser 5, liquid contaminants are condensed, and the condensed contaminants can be collected in by-product tank 6.

Vacuum for the system is provided by pump 7.

The system may be mounted on skid frame 20. The tanks 10 & 6 may be supported with mounts 21 & 22, respectively. Controls 23 and sightglass monitors 24 may be provided for ease of operation.

Heretofore, in spite of earlier work, there is nothing in the existing market which can suit the requirements of providing for the safe cleaning of used lube oils. Preferred practice of the present invention, in general, can provide for the following:

A. Removal of fluids, especially water and solvents, from the used lubricating oils at very low temperatures for the art.

B. Treatment temperature can be kept below eighty degrees C. Thus no damage is caused to the used lube oil.

C. No damage to the environment, since, among other things, the heating of oil is kept to a minimum.

D. Structural body of the lube oils and active additives still present in the used lube oils are not damaged or affected.

E. Employed in the practice of the invention are generally:
  (i) strong vacuum. See e.g., the application Nos. 08/490685 and 07/326333.
  (ii) heating of oil to eighty degrees C., or below, for example, as follows (which values may be considered to be approximate) for removal of the following:
    a) Water, thirty to sixty degrees C.
    b) Solvents, sixty to seventy-eight degrees C.
    c) Gasses are stripped easily thus as well.
  (iii) cold fluids, air and water, at twenty-five degrees C., or below, for example, in conjunction with the heating noted above, as follows (which values may be considered ty be approximate) for removal of the following:
    a) Water, fourteen to twenty-one degrees C.
    b) Solvents, seven to twelve degrees C.
    c) Gasses are stripped easily thus as well.

F. The separator tank receives oils to be treated through the special nozzle spray at mild temperatures. The ultra fine and evenly spread spray is allowed to fall on a cone shaped plate in conjunction with which runs a cold fluid, for example, water. The skirt and drain act to direct the oil efficiently down for pumping out.

G. The invention is meant to be used in a complete sytstm of decontamination of used lube oils for reuse as new oils, with minimal spiking for loss of additives such as caused by loss in engine use. Contamination includes:
  (i) carbonaceous micron and sub-micron sized particles, which can be removed through coagulation/settling.
  (ii) carbonaceous gases, and water and solvents such as diesel, petrol, etc., which can be removed by the practice of the present invention.

H. The invention can also be used on board ships to separate water from engine or other oils for immediate reuse or appropriate storage if desired.

Accordingly hereby, gasses, water and solvents, major contaminants in used lubricating oils, can be removed from used lubricating oils at mild temperature conditions under vacuum. Apparatus in which the removal can take place includes a hollow vacuum separator vessel with a spray nozzle to spray an ultra fine spray of warm, used lubricating oil onto an angularly disposed thin film separator plate. In conjunction with the plate is a cooling device within the vacuum chamber. Cleaned oil can be passed from the bottom back into a holding tank, while water and solvents are drained out into a separate tank for safe disposal.

CONCLUSION

The present invention is thus provided. Numerous modifications can be effected within its spirit, the literal claim scope of which is particularly pointed out as follows:

I claim:

1. An apparatus useful for separating gasses, water and solvents from used lubricating oil, which comprises a vacuum separator tank, which includes a hollow vessel adapted to be subject to a vacuum, and, positioned above a bottom portion of the hollow vessel yet inside the hollow vessel, a spray nozzle positioned above, and to spray a fine mist of oil droplets therefrom onto, a solid evaporator surface, and a cooling device attached to or integral with the evaporator surface to provide cooling to the evaporator surface, said vessel including a volume below the cooling device for containing or passing through oil as bottoms, which arrangement provides for a uniform, thin film of oil for evaporation of fluid contaminants and supply of cleaned oil to to be pumped out as bottoms; and a vacuum pump for drawing vapors emanating from the separator tank thereaway, and for providing a vacuum to the hollow vessel.

2. The apparatus of claim 1, wherein one, solid evaporator surface is present, which is in the shape of a cone with a skirt, which are both directly cooled by the cooling device; the cooling device includes an enclosed conduit for carrying cooling fluid, and an inwardly conical drain is present therebelow.

3. The apparatus of claim 2, wherein the cooling device is adapted to be cooled by water running within the same.

4. An apparatus useful for vacuum separation of a used lubricating oil, which comprises:

a heating vessel for heating of the oil;

a pump for introduction of the oil from the heating vessel to a separator tank;

the separator tank, which includes a hollow vessel adapted to be subject to a vacuum, and, positioned above a bottom portion of the hollow vessel yet inside the hollow vessel, a spray nozzle positioned above, and to spray a fine mist of oil droplets therefrom onto, a solid, angularly disposed, evaporator surface to provide a surface for a uniform, thin film of the oil, and a cooling device attached to or integral with the evaporator surface to provide cooling to the evaporator surface, said vessel including a volume below the cooling device for containing oil as bottoms and a drain plate therebelow, which spray nozzle and evaporator surface arrangement are for providing a uniform, thin film of oil for evaporation of liquid contaminants and supply of cleaned oil to cleaned oil bottoms;

a vacuum pump for drawing vapors emanating from the separator tank thereaway, and for providing a vacuum to the hollow vessel;

a carrying line for carrying the oil as bottoms from the separator tank for reintroduction into the heating vessel for reintroduction to the separator tank;

a product pump for pumping the oil as bottoms through the carrying line said apparatus being adapted for cleaning of the oil under vacuum with spraying of heated oil onto the top of the evaporator surface, evaporating volatile contaminants including water and fuel therefrom and drawing off vapors emanating from the separator tank, drawing off as bottoms and recirculating the same for spraying onto the evaporator surface in the hollow vessel, and finally drawing off decontaminated oil as bottoms.

5. The apparatus of claim 4, wherein the spray nozzle has an annular opening to spray a fine mist of oil droplets from said opening onto the evaporator surface; the evaporator surface is in the shape of a cone; the cooling device includes an enclosed conduit for carrying cooling fluid, and the vacuum pump is positioned to draw vapors through a condenser for condensing vapors emanating from the separator tank.

6. The apparatus of claim 5, wherein the product pump is a mechanical vane pump, which is provided without there being present a venturi pump as the product pump.

7. The apparatus of claim 6, wherein the condenser is an air-cooled shell and tube condenser which has connected to it a condensed vapor holding tank for holding said condensed vapors, and the carrying line runs into a holding tank into which oil as bottoms can be pumped by the product pump, from which oil can be provided to the heating tank during decontamination processing, and in which oil can be stored.

8. A procedure for decontamination of a dirty lubricating oil, comprising the following steps:

(a) providing an apparatus as claimed in claim 1, and an oil storage or settling tank;

(b) providing an oil sample for decontamination;

(c) subjecting the oil sample to contact with a coagulant in the oil storage or settling tank, which coagulant can coagulate micron and submicron sized insoluble particles from the oil sample, and removing coagulated material, which may form, from the oil sample;

(d) with the heating vessel, heating the oil sample to mild operating conditions of temperature, and providing the heated oil sample to the hollow vessel of the separator tank, which is under vacuum conditions, through the spray nozzle so that the oil sample is sprayed as a fine mist of oil droplets onto the evaporator surface as a uniform, thin film of oil for evaporation of liquid contaminants and feed of cleaned oil to cleaned oil bottoms;

(e) with the cooling device, providing cooling;

(f) with the vacuum pump, maintaining vacuum conditions and drawing off vapors emanating from the separator tank;

(g) drawing off oil as bottoms and recirculating the same through the carrying line and into the foregoing as may be desired, and (h) finally drawing off decontaminated oil as bottoms.

9. The procedure of claim 8, wherein the oil sample to be sprayed is at a temperature below 80 degrees C.

10. The procedure of claim 8, wherein the oil sample to be sprayed is heated to a temperature about from 20 to 80 degrees C.

11. The procedure of claim 9, wherein the cooling device is operated at a temperature about from 0 to 25 degrees C.

12. A procedure for decontamination of a dirty lubricating oil, comprising the following steps:

(a) providing an apparatus as claimed in claim 4, and an oil storage or settling tank;

(b) providing an oil sample for decontamination;

(c) subjecting the oil sample to contact with a coagulant in the oil storage or settling tank, which coagulant can coagulate micron and submicron sized insoluble particles from the oil sample, and removing coagulated material, which may form, from the oil sample;

(d) with the heating vessel, heating the oil sample to mild operating conditions of temperature, and with the distillation pump, providing the heated oil sample to the hollow vessel of the separator tank, which is under vacuum conditions, through the spray nozzle so that the oil sample is sprayed as a fine mist of oil droplets onto the angularly disposed, evaporator surface as a uniform, thin film of oil for evaporation of liquid contaminants and feed of cleaned oil to cleaned oil bottoms;

(e) with the cooling device, providing cooling;

(f) with the vacuum pump, maintaining vacuum conditions and drawing off vapors emanating from the distillation tank;

(g) with the product pump, drawing off oil as bottoms and recirculating the same through the carrying line and into the foregoing as may be desired, and (h) finally drawing off decontaminated oil as bottoms.

13. The procedure of claim 12, wherein the oil sample to be sprayed is at a temperature below 80 degrees C., and the cooling device is operated at a temperature about from 0 to 25 degrees C.

* * * * *